(12) United States Patent
Khoury

(10) Patent No.: US 7,933,831 B2
(45) Date of Patent: *Apr. 26, 2011

(54) METHODS AND SYSTEMS FOR VIRTUAL TRADING OF SECURITIES

(76) Inventor: Soohad Khoury, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/782,896

(22) Filed: May 19, 2010

(65) Prior Publication Data

US 2010/0257121 A1    Oct. 7, 2010

Related U.S. Application Data

(63) Continuation of application No. 11/560,149, filed on Nov. 15, 2006, now Pat. No. 7,765,147.

(60) Provisional application No. 60/776,722, filed on Feb. 27, 2006.

(51) Int. Cl.
*G06Q 40/00* (2006.01)
(52) U.S. Cl. .......................................... 705/37; 705/26
(58) Field of Classification Search .................. 705/26, 705/37
See application file for complete search history.

(56) References Cited

U.S. PATENT DOCUMENTS

| | | | |
|---|---|---|---|
| 6,709,330 B1 | 3/2004 | Klein et al. | |
| 6,773,350 B2 | 8/2004 | Yoshimi et al. | |
| 7,587,352 B2 * | 9/2009 | Arnott | 705/36 T |
| 2001/0027430 A1 | 10/2001 | Sabourian | |
| 2001/0042037 A1 | 11/2001 | Kam | |
| 2002/0128952 A1 | 9/2002 | Melkomian | |
| 2002/0133449 A1 | 9/2002 | Segal | |
| 2002/0138383 A1 | 9/2002 | Rhee | |
| 2002/0174042 A1 * | 11/2002 | Arena et al. | 705/35 |
| 2003/0088490 A1 | 5/2003 | Beacham | |
| 2003/0093353 A1 | 5/2003 | Ward et al. | |
| 2003/0115132 A1 | 6/2003 | Iggland | |
| 2003/0126068 A1 | 7/2003 | Hauk | |
| 2003/0187771 A1 | 10/2003 | Bulan | |
| 2003/0220859 A1 | 11/2003 | Cohen | |
| 2004/0243502 A1 | 12/2004 | Slowik | |
| 2004/0254876 A1 | 12/2004 | Coval et al. | |
| 2007/0043666 A1 | 2/2007 | Burdette | |
| 2007/0276752 A1 | 11/2007 | Whiting | |

FOREIGN PATENT DOCUMENTS

| | | |
|---|---|---|
| JP | 04364573 | 12/1992 |
| JP | 2001092896 | 4/2001 |
| JP | 2001265866 | 9/2001 |
| JP | 20022049759 | 2/2002 |
| JP | 2003256755 | 9/2003 |

OTHER PUBLICATIONS

No Author, Virtual Stock Markets, virtualstockmarkets.com, 2005.

* cited by examiner

*Primary Examiner* — Jagdish N Patel
*Assistant Examiner* — Sara Chandler
(74) *Attorney, Agent, or Firm* — James J. Ruttler

(57) ABSTRACT

A virtual trading method and system such that customers select investments, but the funds transferred in the amount of such investments are instead invested by an investment company. Customers receive the value of their selected investments and potentially incentives provided by the investment company, such as rebates.

14 Claims, 1 Drawing Sheet

METHODS AND SYSTEMS FOR VIRTUAL TRADING OF SECURITIES

PRIORITY CLAIM

This application is a continuation of U.S. non-provisional patent application Ser. No. 11/560,149 filed Nov. 15, 2006, which application is a non-provisional of U.S. provisional application Ser. No. 60/776,722 filed Feb. 27, 2006. This application claims priority to each of the foregoing applications. The foregoing applications are hereby incorporated by reference in their entirety as if fully set forth herein.

FIELD OF THE INVENTION

The present invention relates to methods and systems of virtual securities trading, and more particularly, methods and systems of virtual securities trading wherein the securities selected by customers are not actually purchased; instead the funds paid by customers to purchase said securities are invested by an investment company.

BACKGROUND OF THE INVENTION

In recent years, an increasing number of investors have taken direct control of their personal investments. One reason for this trend is technology advances that make it easy for investors to manage their own accounts, often making it more convenient and less expensive than relying on financial intermediaries. However, individual investors often are not as knowledgeable or experienced as professional investors; therefore, their trades often do not result in the same level of profit as those of professional investors. If an investment company were able to use the money invested by individual investors to make investments of the company's choosing, instead of those of the individuals' choosing, it is likely that the company, in the aggregate, would outperform the individual investors. In that case, after paying to the individuals the value of their selected investments, the difference between the performance of the company's investments and the performance of the individuals' investments would be profit for the investment company.

In order for such a system to work, the individual investors would need incentive to allow the money they planned to invest to be used for investment by the investment company, as the individuals would not reap the benefit if the investments of the company did in fact prove to be more profitable. Such incentive could come in the form of a rebate. For instance, a rebate could offset a portion of any losses of the investments chosen by the individuals. In that case, the individuals would receive the full benefits of their chose trades but their losses would be reduced. A rebate could also be calculated based on the amount of money invested by an individual, the length of time the money was invested by the individual, the performance of the investments selected by the individual, or the performance of the investments made by the company. Another form of incentive could be to not charge customers transaction fees for their selected investments or to pay customers a fee for each investment they select.

From the perspective of customers, it would be as if they had actually invested in their chosen securities, with the bonus of any incentives provided by the company. From the perspective of the investment company, the individuals would be supplying a source of capital for investment in any way the investment company saw fit.

Virtual online trading systems are known. For example, U.S. Pat. No. 6,773,350 relates to a virtual trading system based on real data; no actual trades are made. Furthermore, actual online trading systems are known. For example, U.S. patent application Ser. No. 09/825,714 relates to a method for minors to make stock market transactions via the internet. However, none of the references enable individual investors to actually realize the gains and losses of their chosen investments while allowing an investment company access to the funds invested by individuals to make investments of the company's choosing.

Thus, it is an object of the present invention to provide methods and systems for allowing individual investors to select investments. Another object is to allow an investment company to have access to the money invested by individual investors, which will be invested as the company sees fit. Yet another object is to encourage individual investors to participate in the methods and systems of the present invention by allowing the individuals to realize the full gains and losses of their chosen investments while providing incentives, such as rebates or a desirable transaction fee scheme.

SUMMARY OF THE INVENTION

One aspect of the present invention is a method of virtual securities trading comprising the steps of selecting by the customer through an interface one or more investments the customer wishes to make, transferring the cost of the customer investment from the customer to the investment company, recording the cost of the customer investment without actually making the customer investment, investing the transferred funds by the investment company, and transferring the value of the customer investment from the investment company to the customer at the time the customer wishes to divest.

In another aspect of the invention, and as an added incentive to participate in the methods and systems of the current invention, a rebate amount is calculated and paid to the customer. In another aspect of the invention, the profit or loss of a customer investment is calculated through the difference between the cost of a customer investment at the time of divestiture and the recorded cost at the time of customer investment. In another aspect of the invention, the rebate is paid when the customer investment results in a profit. In another aspect of the invention, the rebate is paid when the customer investment results in a loss.

In another aspect of the invention, the customer pays a transaction fee for each customer investment made. In another aspect of the invention, and as an added incentive to participate in the methods and systems of the current invention, the customer pays no transaction fees. In yet another aspect of the invention, and as an added incentive to participate in the methods and systems of the current invention, the customer is paid a fee by the investment company for each customer investment made.

Another aspect of the present invention is a system for virtual trading of securities comprising a selector providing an interface for the customer to select investments, a transferor for transferring money between the customer and the investment company in the amount of the customer investment, a storer for storing relevant information about the customer investment, an accessor allowing the investment company to access the transferred money for investment by the investment company, and a transferor for transferring the value of the customer investment from the investment company to the customer at the time the customer wishes to divest.

In another aspect of the invention, and as an added incentive to participate in the methods and systems of the current invention, the system further comprises a rebator for calculating a rebate amount, which is transferred to the customer.

In another aspect of the invention, the system further comprises a calculator for calculating the customer's profit or loss based on the difference between the cost of the customer investment at the time of divestiture and the recorded cost at the time of the customer investment. In another aspect of the invention, the rebate is transferred to the customer when the customer investment results in a profit. In another aspect of the invention, the rebate is transferred to the customer when the customer investment results in a loss.

In another aspect of the invention, the system further comprises a chargor for charging the customer a transaction fee for each customer investment made. In another aspect of the invention, and as an added incentive to participate in the methods and systems of the current invention, the customer is not charged transaction fees. In yet another aspect of the invention, and as an added incentive to participate in the methods and systems of the current invention, the system further comprises a payor for paying the customer a fee from the investment company for each customer investment made.

Another aspect of the present invention is a system for virtual trading of securities configured and programmed to provide an interface allowing the customer to select investments, to process customer investment requests by allowing the transfer of money between the customer and the investment company in the amount of the customer investment without actually making the customer investment, to provide a database storing relevant information about the customer investment, to allow access to the transferred money for investment by the investment company, and to transfer the value of the customer investment from the investment company to the customer at the time the customer wishes to divest.

In another aspect of the invention, the system is further configured and programmed to calculate a rebate amount and to transfer that amount to the customer. In another aspect of the invention, the system is further configured and programmed to calculate the customer's profit or loss based on the difference between the cost of the customer investment at the time of divestiture and the recorded cost at the time of the customer investment. In another aspect of the invention, the system is further configured and programmed to transfer the rebate to the customer when the customer investment results in a profit. In another aspect of the invention, the system is further configured and programmed to transfer the rebate to the customer when the customer investment results in a loss.

In another aspect of the invention, the system is further configured and programmed to charge the customer a transaction fee for each customer investment made. In another aspect of the invention, and as an added incentive to participate in the methods and systems of the current invention, the system is further configured and programmed to not charge the customer a transaction fee for each customer investment made. In yet another aspect of the invention, and as an added incentive to participate in the methods and systems of the current invention, the system is further configured and programmed to pay the customer a transaction fee for each customer investment made.

In various aspects of the invention, the investment is selected from one or more of the group consisting of a buy order, a sell short order, a put option, and a call option. In various aspects of the invention, investment comprises convertible securities, stocks, futures, forward contracts, swap contracts, bonds, funds, currency, commodities, money markets, or real estate.

DETAILED DESCRIPTION OF THE PREFERRED EMBODIMENTS

Figure 1:
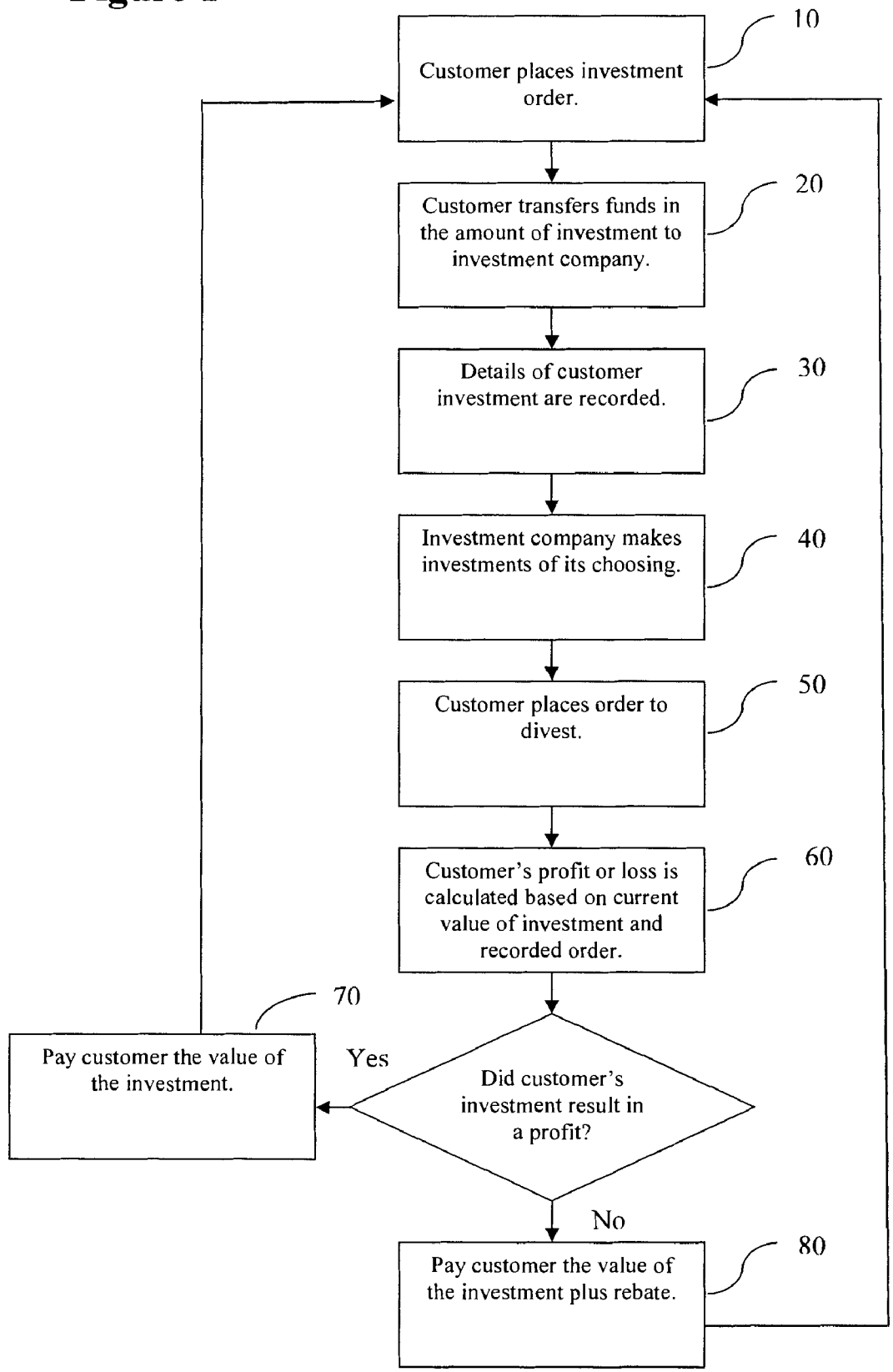
FIG. 1 is a flow chart of exemplary steps involved in the systems and methods of virtual securities trading of the present invention.

The following definitions are not meant to be limiting in nature and serve to provide a clearer understanding of certain aspects of the present invention.

Definitions

Customer Investment—a customer investment relates to the choice by the customer to commit money or other funds or currency through transactions including those typically utilized in security trading such as buying long, selling short, purchasing a call option, or purchasing a put option. Customer investment does not include actually making the transaction selected by the customer.

Divestiture—divestment relates to the choice to dispose of an investment through methods including selling a security, covering a short sell, or exercising an option.

Investment Company Investment—an investment company investment relates to a use by the investment company of the combined funds transferred to the company by customers. Such use is independent of the investments selected by customers and independent of the amounts contributed by individual customers. The investment company may choose to invest the money through transactions typically utilized in security trading such as buying long, selling short, purchasing a call option, or purchasing a put option. The investment company may choose to invest the money in assets including, but not limited to, convertible securities, stocks, futures, forward contracts, swap contracts, bonds, funds, currency, commodities, money markets, or real estate. The investment company may choose to do nothing with the money. The investment company may choose to hire professional investors to manage any portion of the money, to contract out management of any portion of the money, or to turn over to a third party for management any portion of the money.

Rebate—a rebate relates to money paid by the investment company to the customer. The rebate amount may be based on, for example, the amount of money invested by the customer, the length of time the money is invested by the customer, the performance of the customer investment, or the performance of the investments made by the investment company. The rebate may be paid, for example, weekly, monthly, or yearly.

Securities—securities include, but are not limited to, stocks, futures, forward contracts, swap contracts, bonds, funds, currency, commodities, options, money markets, and real estate.

The methods and systems of the present invention may provide real-time market data and communication links to and/or between customers. The invention makes possible the monitoring of securities of various types, the receiving of market data, the entering and executing of orders, and the storage of the orders. In addition, users of the methods and systems of the present invention may automatically receive confirmations of trade executions, access static data from a financial information database, and analyze securities for potential trades using such data and real-time prices.

As will be appreciated by one of ordinary skill in the art, the present invention may be embodied as a method, a system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to a block diagram of methods, apparatus (i.e., systems), and computer program products according to an embodiment of the invention. It is understood that each block of the block diagram, and combinations of blocks in the block diagram, respectively, can be implemented by computer program instructions. These computer program instructions may be loaded onto a general purpose computer, a special purpose computer, or other programmable data processing apparatus to produce a machine, such that the instructions that execute on the computer or other programmable data processing apparatus create means for implementing the functions specified in the diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the diagram block or blocks. The computer program instructions may also be loaded onto a computer or other programmable data processing apparatus to cause a series of operational steps to be performed on the computer or other programmable apparatus so as to produce a computer implemented process, such that the instructions which execute on the computer or other programmable apparatus provide steps for implementing the functions specified in the diagram block or blocks.

Accordingly, blocks of the diagram support combinations of ways for performing the specified functions, combinations of steps for performing the specified functions, and program instruction means for performing the specified functions. It is also understood that each block of the diagram, and combinations of blocks in the block diagram, can be implemented by special purpose hardware-based computer systems that perform the specified functions or steps, or combinations of special purpose hardware and computer instructions.

In one embodiment, the virtual securities trading methods and systems proceeds as shown in FIG. 1. The customer interacts with the investment company through an interface provided by a selector associated with the systems of the present invention. In the context of the present invention, customers may include individuals or groups of individuals who use the methods of the present invention. Specifically, customers may include individuals who normally would trade securities over the internet, for example, through online services such as those commonly available through schwab.com, ameritrade.com, and the like. Interfaces for the customer to practice the present invention include computer interfaces and in particular interfaces for logging into and accessing a customer account and interfaces for performing transactions of securities. Personal or telephone interfaces are also contemplated. Using the interface, the customer selects an investment 10 and relays this choice of investment to the investment company. Such selection of investment may include a choice to buy long, sell short, purchase a call option, purchase a put option, or any type of investment the customer could typically make through other online investment services. Indeed, the interface preferably has the functionality of any of the commonly available trading sites as set forth herein and accurately reflects the real-time pricing in the actual marketplace, for example for stocks the real-time, actual price of a stock on the NASDAQ® exchange.

In this embodiment, the value of the customer investment is then transferred to the investment company through a transferor associated with the systems of the present invention 20. The transfer could occur at the time of investment, with the customer transferring the amount of the investment to the investment company from the customer's bank account held at another financial institution or from the customer's credit card. Alternatively, the customer could set up an account with the investment company in advance of making any investments and fund the account through a transfer of funds, such as from a bank account or credit card. The amount of each investment is then withdrawn from the customer's account held by the investment company. In either case, funds in the amount of the investment are transferred from the control of the customer to the control of the investment company.

In another aspect of the embodiment, the details of the customer investment are recorded by a storer associated with the systems of the present invention 30. Such details include the date of the investment, the total value of the investment, and the type of investment made. However, the investment selected by the customer is not actually made, i.e., the systems and methods of the present invention do not use the customer's funds to carry out the investment the customer chooses. Instead, the money is combined with that of other customers for use by the investment company to make investments of the company's choosing 40. The investment company accesses the funds through an accessor associated with the systems of the present invention. The use of the funds by the investment company is preferably completely independent of the investments selected by customers and the amounts contributed by individual customers. The investment company may choose to invest the money through transactions typically utilized in security trading such as buying long, selling short, purchasing a call option, or purchasing a put option. The investment company may choose to invest the money in assets including, but not limited to, stocks, bonds, funds, currency, commodities, money markets, options, or real estate. The investment company may choose to do nothing with the money. The investment company may choose to hire professional investors to manage any portion of the money, to contract out management of any portion of the money, or to turn over to a third party for management any portion of the money.

In another embodiment, when a customer wishes to divest an investment, the customer once again interacts with the investment company through the interface 50. Upon receiving an order from a customer to divest, for example to sell a security, the investment company transfers funds using a transferor associated with the systems of the present invention. Funds are transferred in the amount of the value of the customer investment at the time of divestiture to the customer under the conditions selected by the customer as if the transaction were conducted in real-time in the actual marketplace for the investment. For example, the customer may choose to sell a security at the market price using the interface. If so, the investment company monitors and records the activity of the customer through the interface and reconciles the divestment with the original investment selection and accurately reflects the real-time pricing in the actual marketplace, for example for stocks the real-time, actual price of a stock on the NASDAQ® exchange. Therefore, from the perspective of the customer it is as if the money had been invested in the investment of the customer's choosing; the customer experiences any gains or losses of the customer's selected investment. Similar to the transfer of funds to the investment company at the time of the customer investment, at divestment the funds may be transferred directly to the customer, to an account of the customer held at another financial institution, or to an account of the customer held by the investment company.

In another embodiment of the present invention, the investment company also offers incentives to the customer to participate in the methods and systems of the present invention. Such incentives may be in the form of rebates or desirable transaction fee schemes. For instance, in one embodiment, the customer receives a rebate if the customer's selected investment results in a loss. A calculator associated with the systems of the present invention calculates the profit or loss of the customer's investment 60 by finding the difference between the value of the customer investment at the time of divestiture and the time of investment selection. This calculation utilizes the recorded information from the time of the investment and the actual value of the customer's selected investment at the time of divestiture. If the customer's investment resulted in a profit 70, the value of the investment at the time of divestment is paid to the customer. However, if the customer's investment resulted in a loss 80, the value of the investment at the time of divestment plus a rebate amount, which is calculated through a rebator associated with the systems of the present invention, is paid to the customer. Alternatively, a rebate may be paid to the customer when the customer's investment resulted in a profit or regardless of whether the customer's investment resulted in a profit or loss. The rebate may be based on the performance of the investment company's investments, instead of the performance of the customer's investment, or may be based on the size or duration of the investments made by the customer.

Furthermore, in lieu of or in addition to rebates, the investment company may provide incentive to the customer to participate by not charging transaction fees to the customer for investments or by paying the customer a transaction fee for each investment placed, such as the transaction fees commonly charged by brokerages per transaction. Therefore, while in one embodiment a chargor, which charges the customer transaction fees, is associated with the systems of the present invention, in another embodiment such chargor is not associated with the systems of the present invention. Furthermore, in another embodiment a payor is associated with the systems of the present invention, which pays the customer a fee for each transaction.

An exemplary hardware environment for an embodiment of the present invention is a typical distributed computer system using the internet to connect client computers running web browsers to server computers executing a computer program embodying the present invention. A typical combination of resources includes client computers that are personal computers or workstations connected via the internet to server computers that are personal computers, workstations, minicomputers, or mainframes. Generally, both the client computers and the server computers are comprised of one or more CPUs, various amounts of RAM storing computer programs and other data, and other components typically found in computers. In addition, both the client computers and the server computers may include one or more monitors and fixed or removable data storage devices such as hard disk drives, floppy disk drives, and/or CD-ROM drives. Also included may be input devices such as mouse pointing devices and keyboards. Both the client computers and the server computers operate under the control of an operating system, such as Windows, Macintosh, UNIX, etc. Furthermore, both the client computers and the server computers each execute one or more computer programs under the control of their respective operating systems. The present invention is preferably implemented as one or more computer programs executed by the server computer, although in alternative embodiments these computer programs may also be executed on the client computer.

In this embodiment, the computer programs implementing the present invention are tangibly embodied in a computer-readable medium, e.g., one or more of the fixed and/or removable data storage devices attached to the computer. Under control of the operating system, the computer programs may be loaded from the data storage devices into the RAM of the computer for subsequent execution by the CPU. The computer programs comprise instructions which, when read and executed by the computer, cause the computer to perform the steps necessary to execute the elements of the present invention.

In this embodiment, a customer begins a session on the system from a client workstation by launching an internet browser program and going to a particular address that connects the client workstation to the central processing center. This is preferably achieved by typing a known URL (universal resource locator) into an address field of the internet browser. At the URL entered, the customer is presented with a log-on screen which preferably requires the customer to input a username and password for identification and verification. A connection to the system over network is then enabled. In addition, other information, such as customer defined preferences, are downloaded to the client workstation.

In this embodiment, the customer is then presented with a command center interface. From the command center interface, a customer can access the features of the system, including those that enable the customer to monitor and control investments. For instance, the command center interface may provide the customer access to investment tools, preference settings, a history of investments, links to external applications, a logout interface (providing secure exit from the system), and an on-line help interface. These options may be customizable by a customer and those described are merely illustrative. Additionally, the command center interface may provide a message display window for displaying real-time messages. These messages may include system information, market information, requests-for-prices, or online chat sessions with other customers. The command center interface may also display information such as the customer's name and the customer's default currency.

The descriptions of the present embodiments are not intended to limit the present invention but merely to provide an illustration of possible embodiments applying the principles of the invention. Numerous other uses could be made by those skilled in the art without departing from the spirit and scope of the invention.

The invention claimed is:

1. A method comprising:
   receiving one or more requests for one or more customer investments;
   redirecting at least some funds for the one or more customer investments into one or more different investments; and
   determining, by one or more processors, one or more returns based at least partially upon the one or more customer investments as if the at least some funds had not been redirected into the one or more different investments by determining one or more costs associated with the one or more customer investments as if the at least some funds had not been redirected; determining one or more values associated with the one or more customer investments as if the at least some funds had not been redirected; and determining one or more differences between the one or more values and the one or more costs.

2. The method of claim 1, wherein the receiving one or more requests for one or more customer investments comprises:
receiving one or more requests for one or more customer investments without actually making the one or more customer investments.

3. The method of claim 1, wherein the receiving one or more requests for one or more customer investments comprises:
receiving one or more requests for one or more customer investments and confirming investment in the one or more customer investments without actually making the one or more customer investments.

4. The method of claim 1, wherein the receiving one or more requests for one or more customer investments comprises:
receiving one or more requests for one or more customer investments and monitoring the one or more customer investments as if the one or more customer investments had been made without actually making the one or more customer investments.

5. The method of claim 1, wherein the redirecting at least some funds for the one or more customer investments into one or more different investments comprises:
redirecting at least some funds for the one or more customer investments into one or more different investments without revealing the redirection to one or more customers.

6. The method of claim 1, wherein the redirecting at least some funds for the one or more customer investments into one or more different investments comprises:
redirecting at least some funds for the one or more customer investments into one or more different investments while maintaining one or more records of the one or more customer investments as if the at least some funds had not been redirected into the one or more different investments.

7. The method of claim 1, wherein the redirecting at least some funds for the one or more customer investments into one or more different investments comprises:
redirecting at least some funds for the one or more customer investments into one or more different investments and transferring at least a portion of the at least some funds into the one or more customer investments at one or more later times.

8. The method of claim 1, wherein the determining one or more returns based at least partially upon the one or more customer investments comprises:
determining one or more returns that include one or more rebates that are based upon one or more of a fixed amount, a customer investment loss, and/or a different investment gain.

9. The method of claim 1, wherein the determining one or more returns based at least partially upon the one or more customer investments as if the at least some funds had not been redirected into the one or more different investments by determining one or more costs associated with the one or more customer investments as if the at least some funds had not been redirected; determining one or more values associated with the one or more customer investments as if the at least some funds had not been redirected; and determining one or more differences between the one or more values and the one or more costs comprises:
determining one or more returns based at least partially upon the one or more customer investments as if the at least some funds had not been redirected into the one or more different investments by determining one or more costs associated with the one or more customer investments as if the at least some funds had not been redirected; determining one or more values associated with the one or more customer investments as if the at least some funds had not been redirected; determining one or more differences between the one or more values and the one or more costs; and determining one or more incentive rebates.

10. The method of claim 1, further comprising:
crediting one or more customer accounts based upon the one or more returns being positive.

11. The method of claim 10, further comprising:
crediting one or more accounts different from the one or more customer accounts with one or more returns of the one or more different investments in excess of the one or more returns of the one or more customer investments.

12. The method of claim 1, wherein operations of the method are implementable in accordance with computer executable instructions embodied in non-transitory computer-readable media.

13. Non-transitory computer readable media bearing one or more computer-executable instructions that when executed by one or more processors result in operations comprising:
receiving one or more requests for one or more customer investments;
redirecting at least some funds for the one or more customer investments into one or more different investments; and
determining one or more returns based at least partially upon the one or more customer investments as if the at least some funds had not been redirected into the one or more different investments by determining one or more costs associated with the one or more customer investments as if the at least some funds had not been redirected; determining one or more values associated with the one or more customer investments as if the at least some funds had not been redirected; and determining one or more differences between the one or more values and the one or more costs.

14. A computer system comprising:
memory having stored software; and
one or more processors operably associated with the memory, wherein execution of the software by at least one of the one or more processors results in operations including
receiving one or more requests for one or more customer investments;
redirecting at least some funds for the one or more customer investments into one or more different investments; and
determining one or more returns based at least partially upon the one or more customer investments as if the at least some funds had not been redirected into the one or more different investments by determining one or more costs associated with the one or more customer investments as if the at least some funds had not been redirected; determining one or more values associated with the one or more customer investments as if the at least some funds had not been redirected; and determining one or more differences between the one or more values and the one or more costs.

* * * * *